(12) United States Patent
Gao (10) Patent No.: US 9,277,466 B2
(45) Date of Patent: Mar. 1, 2016

(54) SIGNALING BASED METHOD AND NETWORK APPARATUS FOR TRANSFERRING INSTANT MDT CONFIGURATION INFORMATION (75) Inventor: Yin Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/345,673

(22) PCT Filed: Jun. 7, 2012

(86) PCT No.: PCT/CN2012/076559
§ 371 (c)(1),
(2), (4) Date: Apr. 11, 2014

(87) PCT Pub. No.: WO2013/040913
PCT Pub. Date: Mar. 28, 2013

(65) Prior Publication Data
US 2014/0228034 A1 Aug. 14, 2014

(30) Foreign Application Priority Data
Sep. 20, 2011 (CN) .......................... 2011 1 0279401

(51) Int. Cl.
H04W 4/00 (2009.01)
H04W 36/00 (2009.01)
(Continued)

(52) U.S. Cl.
CPC .......... *H04W 36/0072* (2013.01); *H04W 24/10* (2013.01); *H04W 36/0033* (2013.01); *H04W 36/14* (2013.01)

(58) Field of Classification Search
CPC ..... H04W 24/10; H04W 24/08; H04W 36/30; H04W 36/18
USPC ................ 455/422.1, 432.1–432.3, 436–439; 370/331
See application file for complete search history.

(56) References Cited

U.S. PATENT DOCUMENTS

2006/0172741 A1* 8/2006 Jeong et al. .................... 455/446
2013/0005340 A1* 1/2013 Drazynski ............. H04W 8/186
455/436

(Continued)

FOREIGN PATENT DOCUMENTS

| CN | 102164375 A | 8/2011 |
|---|---|---|
| WO | 2011093666 A2 | 8/2011 |

OTHER PUBLICATIONS

International Search Report for PCT/CN2012/076559 dated Aug. 20, 2012.

(Continued)

*Primary Examiner* — Dung Hong
(74) *Attorney, Agent, or Firm* — Ling Wu; Stephen Yang; Ling and Yang Intellectual Property (57) ABSTRACT

A method and a network device for transferring signaling based immediate Minimization of Drive Test (MDT) configuration information are provided. The method is applied in an inter-Public Land Mobile Network (PLMN) handover process in a scenario of multiple PLMNs, and includes: during a handover process of a user equipment, if it is determined that a target PLMN selected for the user equipment is the same as one PLMN in an MDT-allowable PLMN list of the user equipment, a source network device transmitting the immediate MDT configuration information of the user equipment to a target network device.

10 Claims, 3 Drawing Sheets

(51) Int. Cl.
  *G08C 17/00* (2006.01)
  *H04W 24/10* (2009.01)
  *H04W 36/14* (2009.01)

(56) References Cited

U.S. PATENT DOCUMENTS

2013/0017826 A1\* 1/2013 Bergquist et al. .......... 455/426.1
2013/0183978 A1\* 7/2013 Keskitalo et al. ............ 455/436

OTHER PUBLICATIONS

3GPP Group, ETSI TS 136 423 v10.2.0, Jun. 30, 2011, section 8.2 and section 9.2.4.

MDT Operation in networks that use equivalent PLMNs and/or RAN sharing; Nokia Corporation; 3GPP TSG-RAN WG2 Meeting #75; Athens, Greece, Aug. 22-26, 2011. R2-113775.
Immediate MDT in the case of Inter-PLMN HO; ZTE; 3GPP TSG RAN WG3#72, Barcelona, Spain, May 9-13, 2011; R3-111362.
MDT support across the PLMNs identified as equivalent; ZTE; 3GPP TSG RAN WG3#73; Athens, Greece, Aug. 22-26, 2011. R3-112136.
MDT solutions for equivalent PLMNs; Alcatel-Lucent ; 3GPP TSG RAN WG3#73; Athens, Greece, Aug. 22-26, 2011. R3-112157.
MDT support for configured ePLMN; Media Tek; 3GPP TSG RAN WG3#73; Athens, Greece, Aug. 22-26, 2011. R3-112203.

\* cited by examiner

SIGNALING BASED METHOD AND NETWORK APPARATUS FOR TRANSFERRING INSTANT MDT CONFIGURATION INFORMATION

TECHNICAL FIELD

The present document relates to the field of wireless communication technology, and in particular, to a method and network device for transferring signaling based immediate Minimization of Drive Test (MDT for short) configuration information.

BACKGROUND OF THE RELATED ART

At present, the Universal Terrestrial Radio Access Network (UTRAN for short) includes a base station (Node B) and a Radio Network Controller (RNC for short), and a corresponding Core Network (CN for short) includes: a Home Subscriber Server (HSS for short), a Mobile Switching Centre Server (MSC Server for short) and a serving General Packet Radio Service (GPRS) Serving GPRS Support Node (SGSN for short) etc. The Evolved Universal Terrestrial Radio Access Network (E-UTRAN for short) includes an evolved NodeB (eNB), and a corresponding core network includes a Home Subscriber Server (HSS for short) and a Mobile Management Entity (MME for short) etc.

In order to reduce the cost and complexity of manual drive test by a carrier using a dedicated device, the Third Generation Partnership Projects (3GPP for short) organization begins to introduce a Minimization of Drive Test (MDT for short) function in Release-10 of the UTRAN and E-UTRAN systems. The MDT function collects a measurement report automatically using a User Equipment (UE for short), reports the measurement report to the Radio Access Network (RAN for short, for the UTRAN system, the RAN refers to RNC, and for the E-UTRAN system, the RAN refers to eNB) through control plane signaling, and reports the measurement report to a Trace Collection entity (Entity TCE for short) of the Operation And Maintenance (OAM for short) through the RAN. The application scenarios of the MDT primarily include aspects such as coverage optimization, capacity optimization, mobility optimization, public channel parameter optimization etc.

The MDT supports Management based MDT and Signaling based MDT. Taking the E-UTRAN system as an example, the process of activating the Management based MDT is generally a process that the OAM transmits a message to the eNB to activate MDT measurements of some UEs, and the eNB selects a UE according to the received area information, and transmits the MDT configuration information to the selected UE; while the process of activating the signaling based MDT is generally a process that the OAM transmits a message to the HSS to activate MDT measurement of a certain UE, the HSS transmits the MDT configuration information of the UE to the MME, the MME transmits the MDT configuration information of the UE to the eNB, and the eNB finally transmits the MDT configuration information to the UE. The Signaling based MDT generally designates a certain UE using an International Mobile Subscriber identity (IMSI for short) or an International Mobile Station Equipment Identity (IMEI for short), and sometimes will limit the selection of the UE with the addition of the area information.

The UE may perform MDT in the connected state and the idle state, wherein, the MDT performed in the connected state is referred to as immediate MDT, and the MDT performed in the idle state is referred to as a logged MDT. There may be two kinds of independent configuration information configured on the UE at the same time, including immediate MDT configuration information and logged MDT configuration information. Wherein, the immediate MDT configuration information is used to instruct the UE to measure and report the immediate MDT, and the logged MDT configuration information is used to instruct the UE to measure and store the logged MDT. Both kinds of MDT configuration information are configured by the network side for the UE when the UE is in a connected state. The immediate MDT refers to a process that the UE in a connected state measures the MDT according to the received immediate MDT configuration information and reports the measurement report to the RAN in time, and the RAN reports it to the TCE; and the logged MDT refers to a process that the UE in an idle state measures the MDT according to the received logged MDT configuration information, stores the obtained measurement report, and reports the measurement report to the RAN until the UE enters a connected state later, and the RAN reports it to the TCE.

At present, for the two different measurement types including immediate MDT and logged MDT, the contents included in corresponding MDT configuration information are also different. Two kinds of configuration information include an MDT applicable range, an available cell list or Time Advance (TA) list, flag information of the UE (only applicable for UE based track in the UMTS) and MDT measurement contents. At the same time, the MDT-allowable Public Land Mobile Network (PLMN) list information may be added in both kinds of MDT configuration information. For the immediate MDT configuration information, it further needs to include a report trigger event, a report interval and a report number; and for the logged MDT configuration information, it further needs to include a logged report interval and logged configuration duration.

In actual networking, the network sharing enables the carriers to manage respective parts of their own flexibly while constructing a communication network cooperatively, thus largely shortening the construction period of the network, and largely reducing the Total Operating Cost (TCO). At the same time, the network sharing may facilitate resource optimization configuration, avoid repeated construction, and implement the maintenance and increment of the assets. Therefore, the network sharing has become a very important issue in the network construction.

Figure 1:
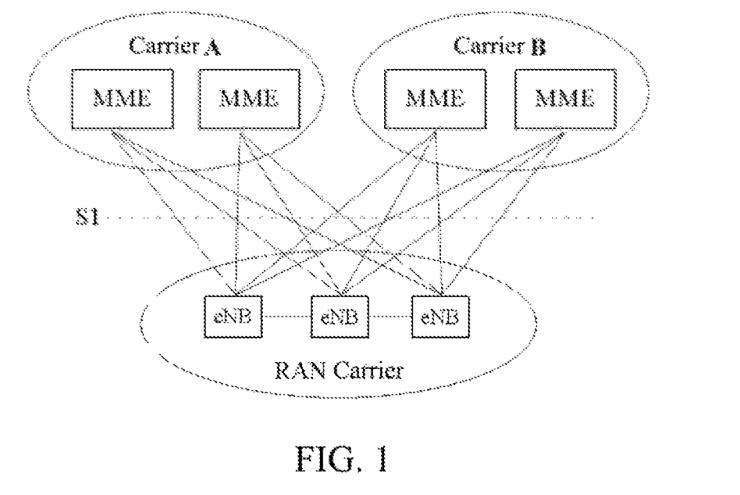
FIG. 1 is a diagram of a network sharing system.

There are many implementation methods for network sharing. One is access network sharing, i.e., multiple carriers share the same RAN in the sharing area, but use the core networks and the service networks independently. As shown in FIG. 1, the carrier A and carrier B may share the RAN provided by the RAN carrier. While in the process of MDT management and maintenance, the carriers want to have the benefit of the function in a network equivalent to the Home Public Land Mobile Network (HPLMN), so as to better collect the network information for network optimization. The equivalent network here may refer to an Equivalent Home PLMN (EHPLMN), or may also be a PLMN selected by a user during roaming and belonging to the same carrier and having the same national code as the HPLMN, which may be referred to as a Visited PLMN (VPLMN).

As long as the UE is located in a PLMN allowing MDT measurement, the UE may be selected to implement a task of MDT measurement. In the current handover process, as long as the UE does not perform an inter-PLMN handover, the immediate MDT configuration information may be transferred during the handover. If the UE performs an inter-PLMN handover, the immediate MDT configuration information of the UE needs to be deactivated, thus resulting in that the UE can not perform the immediate MDT measurement due to lacking of corresponding immediate MDT configuration information, even the UE is handed over to an EPLMN network supporting the mode of signaling based MDT.

SUMMARY OF THE INVENTION

The purpose of the present document is to provide a method and network device for transferring signaling based immediate MDT configuration information, so as to better enable MDT measurement and management in a network sharing scenario.

In order to solve the above problems, the present document provides a method for transferring signaling based immediate MDT configuration information, applied in an inter-PLMN handover process in a scenario of multiple PLMNs, comprising:

during a handover process of a UE, if it is determined that a target PLMN selected for the UE is the same as one PLMN in an MDT-allowable PLMN list of the UE, a source network device transmitting the immediate MDT configuration information of the UE to a target network device.

Preferably, the method further comprises:

the source network device transmitting identity information of the target PLMN selected for the UE and the immediate MDT configuration information of the UE to the target network device; and after the target network device receives the identity information, if it is determined that the target PLMN is a PLMN to which the present device belongs, accepting this handover; otherwise, rejecting this handover.

Preferably, the source network device selecting the target PLMN for the UE comprises:

the source network device selecting one PLMN from an equivalent PLMN list allowed by the UE as the target PLMN, wherein, the equivalent PLMN list is configured and issued by a core network side.

Preferably, the source network device selecting the target PLMN for the UE comprises:

after selecting a target cell for the UE, the source network device acquiring information about PLMNs to which the target cell belongs, and selecting a PLMN from an intersection between the PLMNs to which the target cell belongs and the equivalent PLMN list allowed by the UE as the target PLMN;

wherein, the information about the PLMNs to which the target cell belongs is configured and issued by a network management background, or is acquired by the source network device interacting with the target network device through an X2 interface message;

the equivalent PLMN list is configured and issued by the core network side.

Preferably, transmitting the immediate MDT configuration information of the UE to the target network device comprises:

the source network device transmitting the immediate MDT configuration information of the UE to the target network device through a handover request message.

Correspondingly, the present document further provides a network device for transferring signaling based immediate MDT configuration information, applied in an inter-PLMN handover process in a scenario of multiple PLMNs, the network device, when serving as a source network device, comprising:

a determination unit, configured to determine whether a target PLMN selected by the present device for a UE is the same as one PLMN in an MDT-allowable PLMN list of the UE during a handover process of the UE;

a transmission unit, configured to transmit the immediate MDT configuration information of the UE to a target network device when it is determined by the determination unit that the target PLMN is the same as one PLMN in an MDT PLMN list of the UE.

Preferably, the transmission unit is configured to transmit identity information of the target PLMN selected for the UE and the immediate MDT configuration information of the UE to the target network device; and the network device, when serving as a target network device, comprises a handover judgment unit, configured to after receiving the identity information of the target PLMN selected by the source network device for the UE, if it is determined that the target PLMN is a PLMN to which the present device belongs, accept this handover; otherwise, reject this handover.

Preferably, the network device, when serving as a source network device, further comprises:

a selection unit, configured to select the target PLMN for the UE by means of:

selecting one PLMN from an equivalent PLMN list allowed by the UE as the target PLMN, wherein, the equivalent PLMN list is configured and issued by a core network side.

Preferably, the network device, when serving as a source network device, further comprises:

a selection unit, configured to select the target PLMN for the UE by means of:

after selecting a target cell for the UE, acquiring information about PLMNs to which the target cell belongs, and selecting one PLMN from an intersection between the PLMNs to which the target cell belongs and the equivalent PLMN list allowed by the UE as the target PLMN;

wherein, the information about the PLMNs to which the target cell belongs is configured and issued by a network management background, or is acquired by the source network device interacting with the target network device through an X2 interface message;

the equivalent PLMN list is configured and issued by the core network side.

Preferably, the transmission unit is configured to transmit the immediate MDT configuration information of the UE to the target network device by means of:

transmitting, by the transmission unit, the immediate MDT configuration information of the UE to the target network device through a handover request message.

After the embodiments of the present document are implemented, the MDT measurement and configuration under a signaling based immediate MDT reporting mode during a handover process of a UE are processed effectively in a network sharing scenario in a communication system. Therefore, after the handover is completed, the UE may continue reporting an immediate MDT measurement report in a target network device that meets a condition, thereby implementing the expectation of carriers that the MDT processing in a plurality of PLMNs allowing MDT measurement can be equivalent to the processing in the main PLMN, so as to fully implement the MDT measurement and collection functions performed by the UE and increase the processing efficiency for network optimization.

PREFERRED EMBODIMENTS OF THE INVENTION

In order to make purposes, technical solutions and advantages of the present document clearer, the embodiments of the present document will be described in further detail hereinafter in conjunction with accompanying drawings. It should be illustrated that without conflict, the embodiments of the present application and the features in the embodiments can be combined with each other randomly.

For ease of description, a set comprised of one or more PLMNs where the UE needs to perform MDT measurement is referred to as an MDT PLMN list of the UE. The list is configured and managed by the OAM, and may be issued by means of independently configuring MDT-allowable PLMN list information, or may also be issued by means of including the list in MDT configuration information.

In addition, the network device referred to herein is an LTE base station in the LTE network, and is a RNC in the UTRAN network. The inter-PLMN handover may be an S1 handover or S2 handover between different base stations in the UE scenario, or may also be a handover in the base station; and may be an inter-RNC handover or an intra-RNC handover in the UTRAN scenario.

Figure 2:
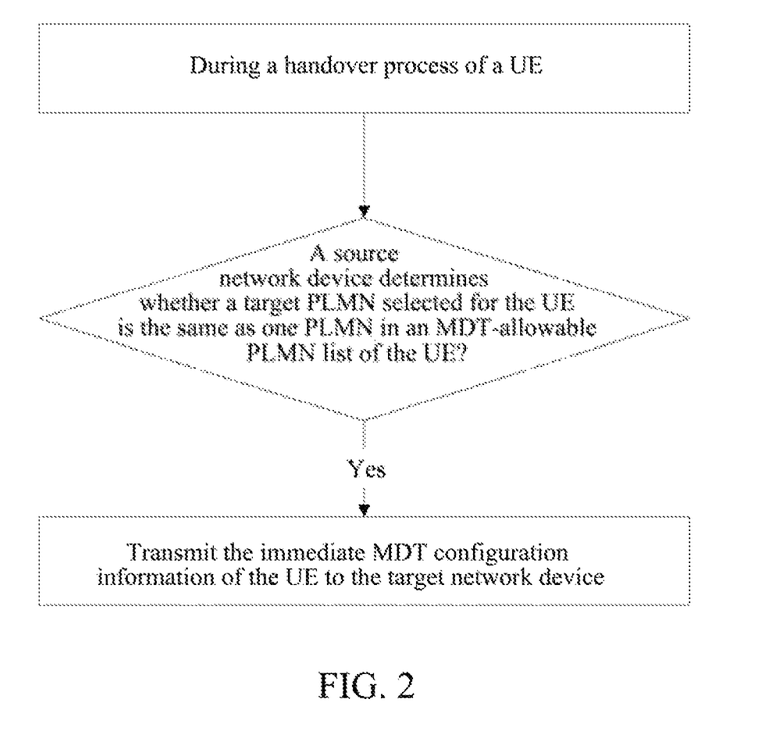
FIG. 2 is a flowchart of a method for transferring signaling based immediate MDT configuration information according to an embodiment of the present document.

In the present embodiment, a method for transferring signaling based immediate MDT configuration information, as shown in FIG. 2, is applied in an inter-PLMN handover process in a scenario of multiple PLMNs, and the method includes:

during a handover process of a UE, if it is determined that a target PLMN selected for the UE is the same as a PLMN in an MDT-allowable PLMN list of the UE, a source network device transmits the immediate MDT configuration information of the UE to a target network device. It should be illustrated that the target network device is a network device serving a target cell to which the UE is to be handed over.

In addition, identity information of the target PLMN selected for the UE may also be transmitted to the target network device. After the target network device receives the identity information, if it is determined that the target PLMN selected by the source network device for the UE is a PLMN to which the present device belongs, this handover is accepted and a corresponding subsequent processing is performed; otherwise, this handover is rejected.

After the handover is successful, the target cell is changed to a current servicing cell of the UE. In the network sharing scenario, if the PLMN to which the current serving cell belongs supports the mode of signaling based immediate MDT, after the related network device in the current serving cell receives the immediate MDT configuration information of the UE, if it is determined that the PLMN to which the current serving cell belongs (serving PLMN for short) is the same as one PLMN in the MDT-allowable PLMN list of the UE, the UE may be selected subsequently to perform immediate MDT measurement.

In another embodiment of the present document, a source network device may select one PLMN from the EPLMN list allowed by the UE as a target PLMN. Wherein, the EPLMN list allowed by the UE is a set of all EPLMNs allowed by the UE, also includes the current serving PLMN of the UE, and may be configured and issued by a core network side.

In another embodiment of the present document, after selecting a target cell for the UE, the source network device may further acquire information about the PLMN to which the target cell belongs and select one therefrom as a target PLMN. Wherein, the information about the PLMNs to which the target cell belongs may be configured and issued by a network management background, or acquired by requesting from the target network device by the source network device through an X2 interface message. The X2 interface message may be an existing message, such as an X2 interface establishment request/response message, or a base station configuration update message etc. After the information is acquired, the source network device may select one PLMN from an intersection between the information about a list of PLMNs to which the target handover cell belongs in the target network device (i.e., Broadcast PLMN list) and the EPLMN list information allowed by the UE (including the current serving PLMN of the UE) as the target PLMN, wherein, the EPLMN list information may also be configured and issued by the core network side.

In the present embodiment, a network device for transferring signaling based immediate MDT configuration information, applied in an inter-PLMN handover process in a scenario of multiple PLMNs, when serving as a source network device, comprises:

a determination unit, configured to determine whether a target PLMN selected by the present device for a UE is the same as one PLMN in an MDT-allowable PLMN list of the UE during a handover process of the UE;

a transmission unit, configured to transmit the immediate MDT configuration information of the UE to a target network device when it is determined by the determination unit that the target PLMN is the same as one PLMN in an MDT PLMN list of the UE.

Preferably, the transmission unit is configured to transmit identity information of the target PLMN selected for the UE and the immediate MDT configuration information of the UE to the target network device; and when serving as a target network device, the network device comprises a handover judgment unit, configured to after receiving the identity information of the target PLMN selected by the source network device for the UE, if it is determined that the target PLMN is a PLMN to which the present device belongs, accept this handover; otherwise, reject this handover.

Preferably, when serving as a source network device, the network device further comprises:

a selection unit, configured to select the target PLMN for the UE by means of:

selecting one PLMN from an equivalent PLMN list allowed by the UE as the target PLMN, wherein, the equivalent PLMN list is configured and issued by a core network side.

Preferably, when serving as a source network device, the network device further comprises:

a selection unit, configured to select the target PLMN for the UE by means of:

after selecting a target cell for the UE, further acquiring information about PLMNs to which the target cell belongs, and selecting one PLMN from an intersection between the PLMNs to which the target cell belongs and the equivalent PLMN list allowed by the UE as the target PLMN;

wherein, the information about PLMNs to which the target cell belongs is configured and issued by a network management background, or is acquired by the source network device interacting with the target network device through an X2 interface message;

the equivalent PLMN list is configured and issued by the core network side.

Preferably, the transmission unit is configured to transmit the immediate MDT configuration information of the UE to the target network device by means of:

transmitting, by the transmission unit, the immediate MDT configuration information of the UE to the target network device through a handover request message.

In the following, four application examples will be used to further illustrate by taking an LTE system as an example. It should be illustrated that when the methods in the following various examples are applied in the UTRAN system, the LTE base station is substituted by the RNC in the following various handover processes, and the S1 interface and the X2 interface are substituted by the Iu interface and the Iur interface respectively.

Application Example One

Figure 3:
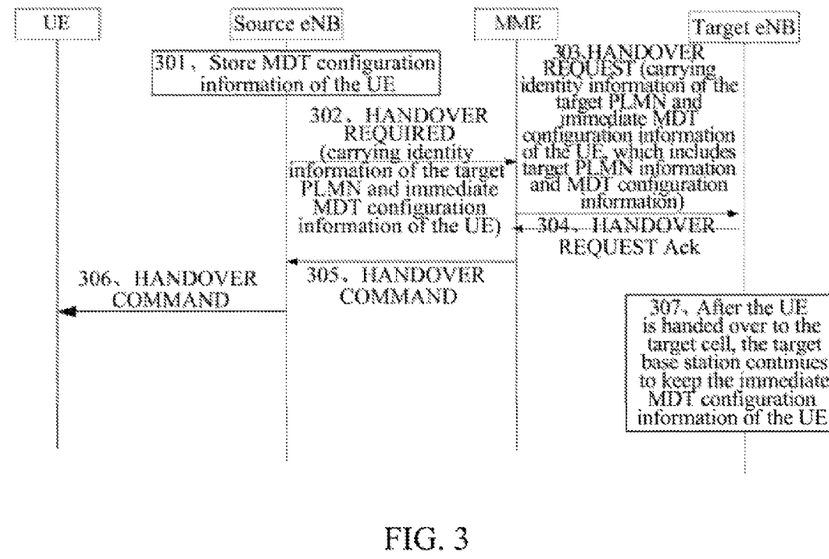
FIG. 3 is a flowchart of a method for transferring an MDT measurement configuration in an LTE scenario according to application example one of the present document.

As shown in FIG. 3, the process of transferring immediate MDT configuration information during S1 handover in the UE scenario is as follows.

In step 301, the source base station stores the immediate MDT configuration information of the UE transmitted by the MME;

in step 302, when it is judged that the UE needs to perform S1 handover, the source base station selects a suitable target cell for the UE, and acquires information about a list of all PLMNs to which the target cell belongs (i.e., a broadcast PLMN list). Wherein, the mode of acquiring the list information may be: acquiring from a network management background, or acquiring from a target base station through an X2 interface message. When it is determined that the target PLMN of the UE is the same as one PLMN in the MDT-allowable PLMN list of the UE, the source base station transmits a HANDOVER REQUIRED message to the MME through the S1 interface, wherein, the HANDOVER REQUIRED message carries identity information of a target PLMN to which the UE is to be handed over and immediate MDT configuration information of the UE. The target PLMN here is one PLMN in the intersection between the information about a list of all PLMNs to which the target cell served by the target network device belongs (i.e., a Broadcast PLMN list) and the EPLMN list information allowed by the UE (including the current serving PLMN of the UE);

in step 303, after the MME receives the HANDOVER REQUIRED message, the MME transmits a HANDOVER REQUEST message to the target base station through the S1 interface, wherein, the HANDOVER REQUEST message carries identity information of the target PLMN to which the UE is to be handed over and the immediate MDT configuration information of the UE;

in step 304, after the target base station receives the HANDOVER REQUEST message, the target base station prepares resources required by the handover, and transmits a HANDOVER REQUEST ACKNOWLEDGE message to the MME after the preparation is completed;

in step 305, the MME transmits a HANDOVER COMMAND to the source base station;

in step 306, after receiving the HANDOVER COMMAND, the source base station transmits the HANDOVER COMMAND to the UE described above through an air interface; and in step 307, after the UE is handed over to the target cell, the target base station may continue to keep the immediate MDT configuration information of the UE, so that the configuration information is still valid in the next handover process of the UE. If the serving PLMN after the handover is consistent with one PLMN in the MDT-allowable PLMN list information of the UE, the target base station may continue to process the immediate MDT measurement report which is reported by the UE.

Application Example Two

Figure 4:
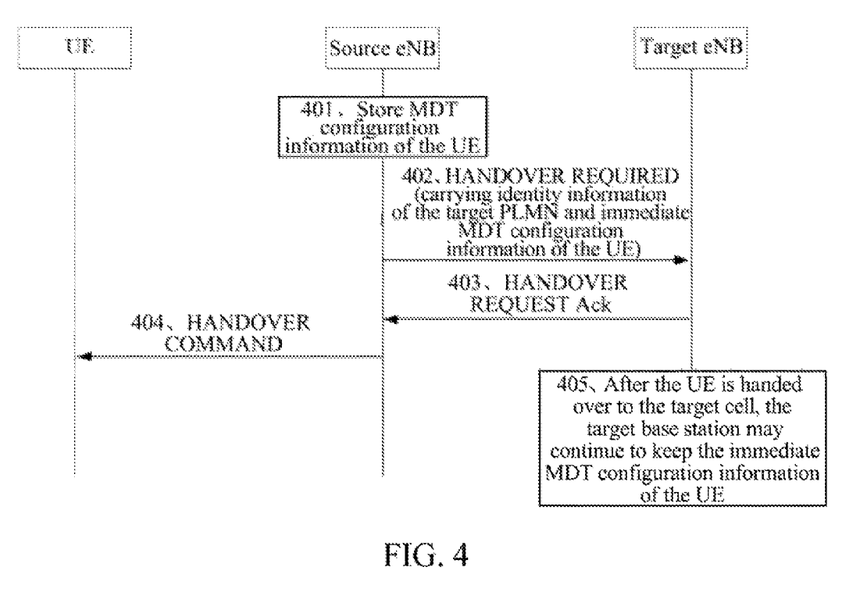
FIG. 4 is a flowchart of a method for transferring an MDT measurement configuration in an LTE scenario according to application example two of the present document.

As shown in FIG. 4, the process of transferring immediate MDT configuration information during X2 handover in the UE scenario is as follows.

In step 401, the source base station stores the immediate MDT configuration information of the UE transmitted by the MME;

in step 402, when it is judged that the UE needs to perform X2 handover, the source base station selects a suitable target cell for the UE, and acquires information about a list of all PLMNs to which the target cell belongs (i.e., a broadcast PLMN list). Wherein, the mode for acquiring the list information may be: acquiring from a network management background, or acquiring from a target base station through an X2 interface message. When it is determined that the target PLMN of the UE is the same as one PLMN in the MDT-allowable PLMN list of the UE, the source base station transmits a HANDOVER REQUIRED message to the target base station through the X2 interface, wherein, the HANDOVER REQUIRED message carries identity information of a target PLMN to which the UE is to be handed over and immediate MDT configuration information of the UE. The target PLMN here is one PLMN in the intersection between the information about a list of all PLMNs to which the target cell served by the target network device belongs (i.e., a Broadcast PLMN list) and the PLMN list information allowed by the UE (including the current serving PLMN of the UE);

in step 403, after the target base station receives the HANDOVER REQUIRED message, the target base station prepares resources required by the handover, and transmits a HANDOVER REQUEST ACKNOWLEDGE message to the source base station after the preparation is completed;

in step 404, after receiving the message, the source base station transmits the HANDOVER COMMAND to the UE described above through an air interface; and in step 405, after the UE is handed over to the target cell, the target base station may continue to keep the immediate MDT configuration information of the UE, so that the configuration information is still valid in the next handover process of the UE. If the serving PLMN after the handover is consistent with one PLMN in the MDT-allowable PLMN list information of the UE, the target base station may continue to process the immediate MDT measurement report which is reported by the UE.

Application Example Three

Figure 5:
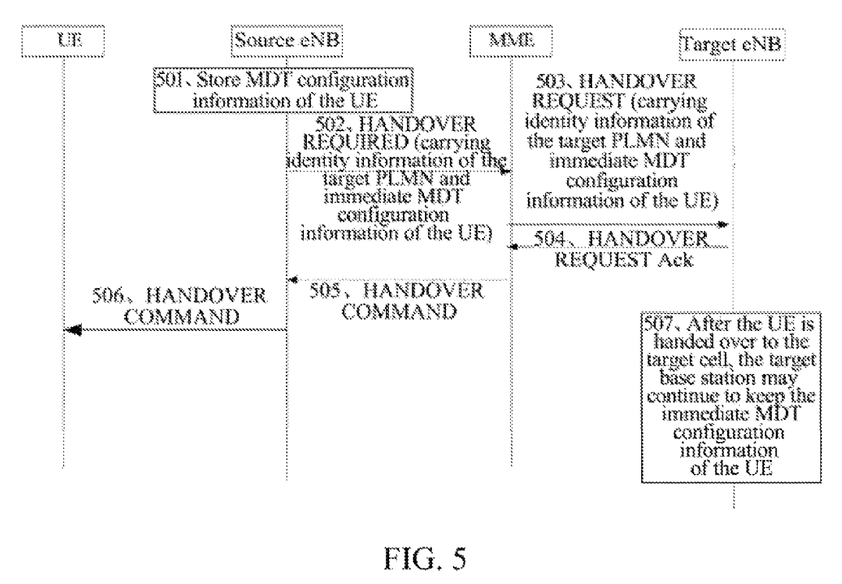
FIG. 5 is a flowchart of a method for transferring an MDT measurement configuration in an LTE scenario according to application example three of the present document.

As shown in FIG. 5, the process of transferring immediate MDT configuration information during S1 handover in the LTE scenario is as follows.

In step 501, the source base station stores the immediate MDT configuration information of the UE transmitted by the MME;

in step 502, when it is judged that the UE needs to perform S1 handover, the source base station selects a suitable target cell for the UE, and acquires information about a list of all PLMNs to which the target cell belongs (i.e., a broadcast PLMN list). Wherein, the mode for acquiring the list information may be: acquiring from a network management background, or acquiring from a target base station through an X2 interface message. When it is determined that the target PLMN of the UE is the same as one PLMN in the MDT-allowable PLMN list of the UE, the source base station transmits a HANDOVER REQUIRED message to the MME through the S1 interface, wherein, the HANDOVER REQUIRED message carries identity information of a target PLMN to which the UE is to be handed over and immediate MDT configuration information of the UE. The target PLMN here exists in the EPLMN list information allowed by the UE (including the current serving PLMN of the UE);

in step 503, after the MME receives the HANDOVER REQUIRED message, the MME transmits a HANDOVER REQUEST message to the target base station through the S1 interface, wherein, the HANDOVER REQUEST message carries identity information of the target PLMN to which the UE is to be handed over and the immediate MDT configuration information of the UE;

in step 504, after the target base station receives the HANDOVER REQUEST message, if it is determined that the target PLMN selected by the source base station for the UE is not in the information about a list of all PLMNs to which the target handover cell belongs (i.e., Broadcast PLMN list), the target base station may reject this handover, and the process ends; otherwise, the target base station prepares resources required by the handover, and transmits a HANDOVER REQUEST ACKNOWLEDGE message to the MME after the preparation is completed;

in step 505, the MME transmits a HANDOVER COMMAND to the source base station;

in step 506, after receiving the HANDOVER COMMAND, the source base station transmits the HANDOVER COMMAND to the UE described above through an air interface; and in step 507, after the UE is handed over to the target cell, the target base station may continue to keep the immediate MDT configuration information of the UE, so that the configuration information is still valid in the next handover process of the UE. If the serving PLMN after the handover is consistent with one PLMN in the MDT-allowable PLMN list information of the UE, the target base station may continue to process the immediate MDT measurement report which is reported by the UE.

Application Example Four

Figure 6:
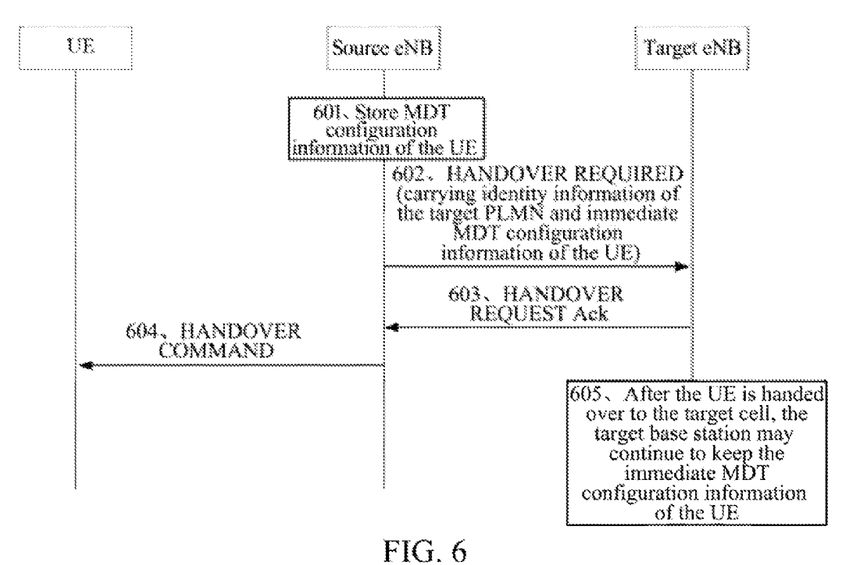
FIG. 6 is a flowchart of a method for transferring an MDT measurement configuration in an LTE scenario according to application example four of the present document.

As shown in FIG. 6, the process of transferring immediate MDT configuration information during X2 handover in the LTE scenario is as follows.

In step 601, the source base station stores the immediate MDT configuration information of the UE transmitted by the MME;

in step 602, when it is judged that the UE needs to perform X2 handover, the source base station selects a suitable target cell for the UE, and acquires information about a list of all PLMNs to which the target cell belongs (i.e., a broadcast Wherein, the mode for acquiring the list information may be: acquiring from a network management background, or acquiring from a target base station through an X2 interface message. When it is determined that the target PLMN of the UE is the same as one PLMN in the MDT-allowable PLMN list of the UE, the source base station transmits a HANDOVER REQUIRED message to the target base station through the X2 interface, wherein, the HANDOVER REQUIRED message carries identity information of a target PLMN to which the UE is to be handed over and immediate MDT configuration information of the UE. The target PLMN here exists in the EPLMN list information allowed by the UE (including the current serving of the UE);

in step 603, after the target base station receives the HANDOVER REQUIRED message, if it is determined that the target PLMN selected by the source base station for the UE is not in the information about a list of all PLMNs to which the target handover cell belongs (i.e., Broadcast PLMN list), the target base station may reject this handover, and the process ends; otherwise, the target base station prepares resources required by the handover, and transmits a HANDOVER REQUEST ACKNOWLEDGE message to the source base station after the preparation is completed;

in step 604, after receiving the message, the source base station transmits the HANDOVER COMMAND to the UE described above through an air interface; and in step 605, after the UE is handed over to the target cell, the target base station may continue to keep the immediate MDT configuration information of the UE, so that the configuration information is still valid in the next handover process of the UE. If the serving PLMN after the handover is consistent with one PLMN in the MDT-allowable PLMN list information of the UE, the target base station may continue to process the immediate MDT measurement report which is reported by the UE.

A person having ordinary skill in the art can understand that all or part of steps in the above method can be implemented by programs instructing related hardware, and the programs can be stored in a computer readable storage medium, such as a read-only memory, disk or disc etc. Alternatively, all or part of steps in the above embodiments can also be implemented by one or more integrated circuits. Accordingly, various modules/units in the above embodiments can be implemented in a form of hardware, or can also be implemented in a form of software functional module. The present document is not limited to any particular form of a combination of hardware and software.

The above description is only the preferred embodiments of the present document and is not intended to limit the protection scope of the present document. According to the inventive contents of the present document, the present document can also have a plurality of other embodiments, and those skilled in the related art can make various corresponding modifications and variations according to the present document, without departing from the spirit and essence thereof of the present document. All corresponding modifications, equivalent variations, improvements made within the spirit and principle of the present document should fall into the protection scope of the present document.

INDUSTRIAL APPLICABILITY

After the embodiments of the present document are implemented, the MDT measurement and configuration under a signaling based immediate MDT reporting mode during a handover process of a UE are processed effectively in a network sharing scenario in a communication system. After the handover is finished, the UE may continue reporting an immediate MDT measurement report in a target network device that meets a condition, thereby implementing the expectation of carriers that the MDT processing in a plurality of PLMNs allowing MDT measurement can be equivalent to the processing in the main PLMN, so as to fully implement the MDT measurement and collection functions performed by the UE and increase the processing efficiency for network optimization.

What is claimed is:

1. A method for transferring signaling based immediate Minimization of Drive Test (MDT) configuration information, applied in an inter-Public Land Mobile Network (PLMN) handover process in a scenario of multiple PLMNs, comprising:

during a handover process of a user equipment, a source network device determining whether a target PLMN selected for the user equipment is the same as a PLMN in an MDT-allowable PLMN list of the user equipment; and when the source network device determining that the target PLMN selected for the user equipment is the same as a PLMN in the MDT-allowable PLMN list of the user equipment, the source network device transmitting the immediate MDT configuration information of the user equipment to a target network device;

wherein the method further comprising: the source network device selecting the target PLMN for the user equipment, which comprises:

after selecting a target cell for the user equipment, the source network device acquiring information about PLMNs to which the target cell belongs, and selecting a PLMN from an intersection between the PLMNs to which the target cell belongs and the equivalent PLMN list allowed by the user equipment as the target PLMN;

wherein the information about the PLMNs to which the target cell belongs is configured and issued by a network management background, or is acquired by the source network device interacting with the target network device through an X2 interface message;

the equivalent PLMN list is configured and issued by a core network side.

2. The method according to claim 1, further comprising:

the source network device transmitting identity information of the target PLMN selected for the user equipment along with the immediate MDT configuration information of the user equipment to the target network device; and after receiving the identity information, the target network device determining whether the target PLMN is a PLMN to which the target network device belongs;

if the target PLMN is a PLMN to which the target network device belongs, accepting this handover; otherwise, rejecting this handover.

3. The method according to claim 2, wherein, transmitting the immediate MDT configuration information of the user equipment to the target network device comprises:

the source network device transmitting the immediate MDT configuration information of the user equipment to the target network device through a handover request message.

4. The method according to claim 1, wherein, the method further comprising:

the source network device selecting the target PLMN for the user equipment, which comprises:

the source network device selecting a PLMN from an equivalent PLMN list allowed by the user equipment as the target PLMN, wherein, the equivalent PLMN list is configured and issued by a core network side.

5. The method according to claim 1, wherein, transmitting the immediate MDT configuration information of the user equipment to the target network device comprises:

the source network device transmitting the immediate MDT configuration information of the user equipment to the target network device through a handover request message.

6. A network device for transferring signaling based immediate Minimization of Drive Test (MDT) configuration information, applied in an inter-Public Land Mobile Network (PLMN) handover process in a scenario of multiple PLMNs, the network device, when serving as a source network device, comprising:

a determination unit, configured to determine whether a target PLMN selected by the source network device for a user equipment is the same as a PLMN in an MDT-allowable PLMN list of the user equipment during a handover process of the user equipment;

a transmission unit, configured to transmit the immediate MDT configuration information of the user equipment to the target network device when the determination unit determining that the target PLMN is the same as a PLMN in an MDT PLMN list of the user equipment;

a selection unit, configured to select a target PLMN for the user equipment by means of:

after selecting a target cell for the user equipment, acquiring information about PLMNs to which the target cell belongs, and selecting a PLMN from an intersection between the PLMNs to which the target cell belongs and the equivalent PLMN list allowed by the user equipment as the target PLMN;

wherein the information about the PLMNs to which the target cell belongs is configured and issued by a network management background, or is acquired by the source network device interacting with the target network device through an X2 interface message;

the equivalent PLMN list is configured and issued by a core network side.

7. The network device according to claim 6, wherein, the transmission unit is configured to transmit identity information of the target PLMN selected for the user equipment along with the immediate MDT configuration information of the user equipment to the target network device; and the network device, when serving as a target network device, comprises a handover judgment unit, the handover judgment unit is configured to: after receiving identity information of a target PLMN selected by the source network device for the user equipment, determine whether the target PLMN is a PLMN to which the network device belongs;

if the target PLMN is a PLMN to which the network device belongs, accept this handover; otherwise, reject this handover.

8. The network device according to claim 7, wherein, the transmission unit is configured to transmit the immediate MDT configuration information of the user equipment to the target network device by means of:

transmitting, by the transmission unit, the immediate MDT configuration information of the user equipment to the target network device through a handover request message.

9. The network device according to claim 6, wherein, the network device, when serving as a source network device, further comprises:
a selection unit, configured to select a target PLMN for the user equipment by means of:
selecting a PLMN from an equivalent PLMN list allowed by the user equipment as the target PLMN, wherein, the equivalent PLMN list is configured and issued by a core network side.

10. The network device according to claim 6, wherein,
the transmission unit is configured to transmit the immediate MDT configuration information of the user equipment to the target network device by means of:
transmitting, by the transmission unit, the immediate MDT configuration information of the user equipment to the target network device through a handover request message.

* * * * *